H. C. BABEL.
APPARATUS FOR THE CONSTRUCTION OF PLASTIC WALLS.
APPLICATION FILED NOV. 12, 1909.
955,304. Patented Apr. 19, 1910.
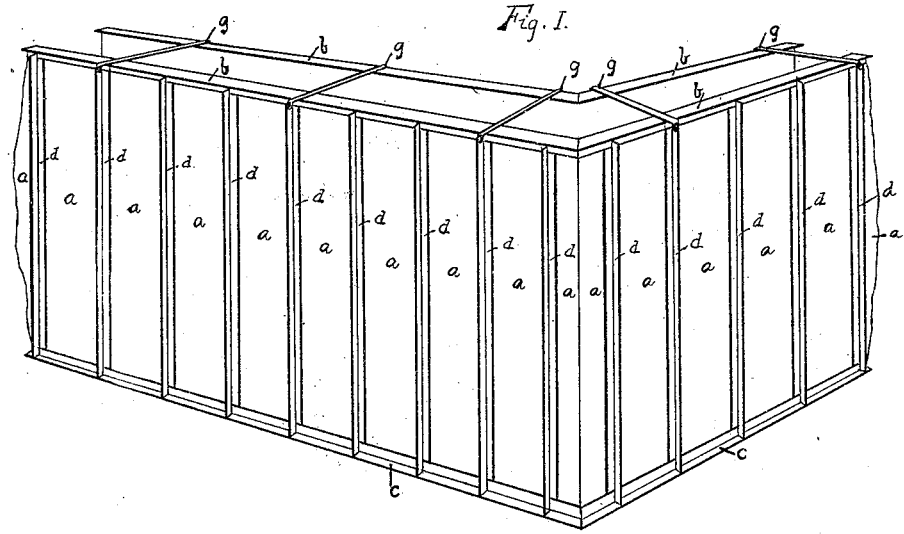
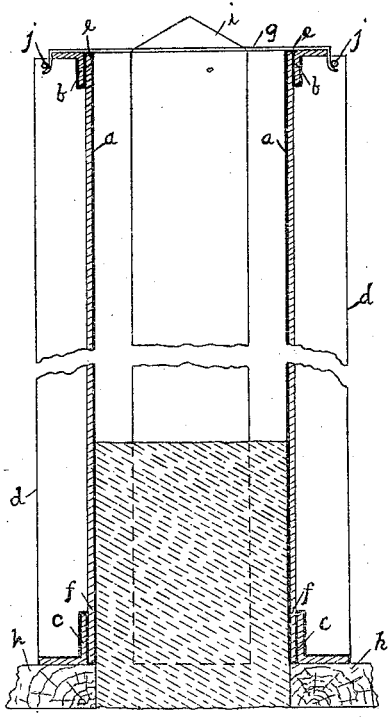
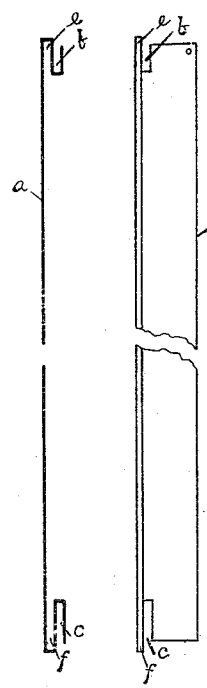
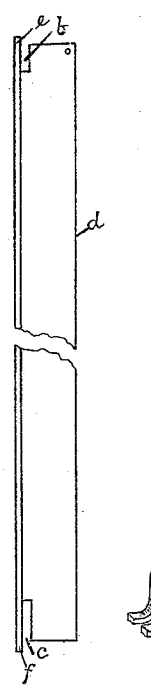
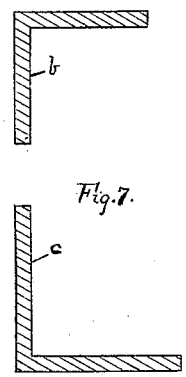
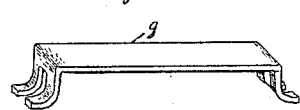
WITNESSES:
INVENTOR

UNITED STATES PATENT OFFICE.

HENRY CLAY BABEL, OF BUFFALO, NEW YORK.

APPARATUS FOR THE CONSTRUCTION OF PLASTIC WALLS.

955,304.
Specification of Letters Patent. Patented Apr. 19, 1910.

Application filed November 12, 1909. Serial No. 527,726.

*To all whom it may concern:*

Be it known that I, HENRY CLAY BABEL, a citizen of the United States, residing at Buffalo, in the county of Erie and State of New York, have invented certain new and useful Improvements in Apparatus for the Construction of Plastic Walls, of which the following is a specification, reference being had therein to the accompanying drawings.

My invention relates to improvements in apparatus for the construction of solid and hollow walls of cement, concrete, and other plastic materials.

One object of my invention is to provide a light-weight but rigid sheet-metal mold for forming foundation, factory, dwelling, and other walls of plastic materials in one continuous piece or section with both inner and outer wall-surfaces perfectly smooth and free from blemishes and defects due to tie-rods, projection and other unavoidable penetrations of the plastic material by parts of the molding device and the means employed for holding the various parts in proper position.

Another object of my invention is to provide a molding device which may be used an indefinite number of times and which shall be practically indestructible because it is composed entirely of iron, steel, or other metal, thus doing away with the unavoidable expense attending the use of wood forms built up on the job and later removed with but little salvage.

Another object of my invention is to provide a molding device of such design as will readily admit of suitable reinforcement to increase the lateral pressure resistance of the light-weight metal sheets employed and hold them in perfect alinement at the top and bottom, with all parts so adjusted that they can be quickly taken apart after the plastic material has set.

Another object of my invention is to provide a sheet-metal molding device composed of light-weight sheets or sections of such design that the vertical edges of the several sheets shall interlock without overlapping or projections of any kind, thus insuring a perfectly smooth wall-surface at all points.

I obtain my objects by the apparatus illustrated in the accompanying drawings, in which—

Figure 1 is a perspective of a section of the device or mold as used for straight rectangular walls; Fig. 2 is a transverse section of the molding device partly filled with plastic material and showing position of metal core used to hollow the walls; Fig. 3 is a transverse section of one of the plates or sections of the sheet-metal mold-walls showing the design thereof and the spaces provided for the top and bottom longitudinal reinforcement marked "*b c*" and the top and bottom spaces provided for the insertion of the flat face of the upright or vertical reinforcement bars marked "*e f*". Fig. 4 is a front view of one of the upright or vertical reinforcement tee-bars showing the spaces provided for the U-shaped spaces in the sheet-metal mold-walls marked "*b c*" which receive the longitudinal angle-bars and the location near the upper right hand corner of the cotter-pins which hold in position the tie-rods "*g*" which regulate the thickness of the wall to be built and attach the inner and outer mold-walls together at the top. Fig. 5 is a top plan view of two of the metal sheets which form the mold-walls showing the metal straps attached by means of small counter-sunk rivets to the vertical edges, the one inverse to the other, which cause the sheets to interlock, thus perfectly abutting the edges and effectively covering the joints or seams so as to prevent the plastic material from leaking through. Fig. 6 is an enlarged transverse sectional view of the longitudinal reinforcement angle-bars which are inserted in the U-shaped spaces marked "*b*" of the metal sheets composing the mold-walls and hold them in alinement at the top. Fig. 7 is an enlarged transverse sectional view of the longitudinal reinforcement angle-bars inserted in the U-shaped spaces marked "*c*" of the metal sheets composing the mold-walls and hold them in alinement at the bottom. Fig. 8 represents the tie-rods "*g*" with U-shaped curved ends which fit over the upper ends of certain of the vertical reinforcement bars and engage cotter-pins and serve to effectively lock the opposing mold-sections together and, by suitable variations in length, regulate the thickness of the wall to be built.

Similar letters refer to similar parts throughout the several views.

"*a*" represents the sheet-metal mold-wall, which is composed preferably of 24-gage galvanized sheets ninety-six inches high before the top and bottom edges are shaped to form what may be termed a double-U, the one inverse to the other, which U-shaped spaces receive the longitudinal and vertical reinforcement bars. The width is preferably thirty-six inches; but any other metal sheets, galvanized or ungalvanized, may be employed, of whatever length, width, and thickness may be most convenient or best suited to the work to be done with the mold.

"$b$" represents the spaces provided for and the longitudinal reinforcement angle-bars which hold the several sheets or sections of the metal mold-walls in alinement at the top. These are preferably galvanized steel $1''x1''x\tfrac{1}{8}''$ and of such length as the number of sheets employed may require, but may be heavier or lighter as well as any other angle or tee shaped galvanized or ungalvanized metal bar of suitable length.

"$c$" represents the spaces provided for and the longitudinal reinforcement angle-bars which hold the several sheets or sections of the metal mold-wall in alinement at the bottom. These are preferably steel $1\tfrac{1}{4}''x1\tfrac{1}{4}''x\tfrac{1}{8}''$, galvanized and of such length as the number of sheets employed may require, but may be heavier or lighter as well as any other galvanized or ungalvanized angle or tee shaped metal bar of suitable length.

"$d$" represents the upright or vertical reinforcement bars, which may be any desired number, and which are preferably steel tees $1\tfrac{1}{2}''x1\tfrac{1}{2}''x\tfrac{1}{8}''$, galvanized and of a length suited to the height of the sheets to be reinforced; but may be heavier or lighter and of any other galvanized or ungalvanized tee or angle shaped metal.

"$e\ f$" represent the ends of the flat face of the tee-bars "$d$" used as vertical reinforcement and which are inserted in the U-shaped spaces in the top and bottom of the sheets composing the mold-walls and also marked "$e\ f$."

"$h$" represents wood bearings preferably $2''$ thick and $8''$ wide upon which the molding device rests and which are kept the desired distance apart and from spreading by long iron pins driven through suitable openings into the ground.

"$i$" represents the metal cores used to hollow out the walls and render them proof against frost and dampness.

"$j$" represents the cotter-pins which hold the ends of the tie-rods "$g$" in position and prevent the two opposing mold-walls from moving toward each other at the top.

"$k$" represents the doubled metal bands or straps which are attached, the one inverse to the other, to the vertical edges of the sheets composing the mold-walls to make them interlocking and secure a perfect abutment of the edges.

For corners, bays and other angles in the wall to be built, the U-shaped top and bottom edges of the sheets composing the mold-walls are cut away at the point where the angle comes and are then bent into the particular angle desired. Likewise, the longitudinal reinforcement bars are bent to the proper angle, when they will fit into place.

The dimensions given are to be regarded simply as an example of a convenient construction, and it is to be understood that they may be varied to any extent without departing from the spirit of my invention.

What I claim as my invention and desire to secure by Letters Patent of the United States, is:

1. A mold for casting plastic materials, comprising two mold walls, each wall consisting of a series of metal sheets having their top and bottom edges turned laterally away from the wall, and then toward each other to form hooks for vertical reinforcements, and then turned laterally away from the wall, and then turned in opposite directions to form hooks for longitudinal reinforcements, a series of vertical reinforcements having tongues to fit in the first mentioned hooks, and longitudinal reinforcements comprising bars fitting on the second mentioned hooks.

2. A mold for forming walls of plastic materials, comprising longitudinal bearings set one on each side of the proposed wall, angle irons secured to the longitudinal bearings, a series of sheet metal plates having their upper and lower edges turned laterally away from the wall, and then turned toward each other to form hooks for vertical reinforcements, and then turned laterally away from the wall, and then turned in opposite directions to form hooks for longitudinal reinforcements, the lower ones of said latter hooks fitting over the angle irons, angle irons fitting in the upper ones of said latter hooks, vertical reinforcements having tongues fitting in the first mentioned hooks, and fitting between the angle irons, and tie rods connecting the upper edges of the metal plates.

In testimony whereof I have signed my name to this specification in the presence of two subscribing witnesses.

HENRY CLAY BABEL.

Witnesses:
  SAMUEL J. HARRIS,
  GEORGE D. CROFTS.